(12) United States Patent
Valdemarsson et al.

(10) Patent No.: US 11,668,598 B2
(45) Date of Patent: Jun. 6, 2023

(54) DEVICE FOR DETERMINING A WEIGHT OF A VEHICLE AND METHODS THEREOF

(71) Applicant: MOTUS WEIGHING AB, Gothenburg (SE)

(72) Inventors: Stefan Valdemarsson, Lidköping (SE); Marcus Timmerman, Götene (SE)

(73) Assignee: MOTUS WEIGHING AB, Gothenburg (SE)

( * ) Notice: Subject to any disclaimer, the term of this patent is extended or adjusted under 35 U.S.C. 154(b) by 88 days.

(21) Appl. No.: 16/975,044

(22) PCT Filed: Jan. 29, 2019

(86) PCT No.: PCT/SE2019/050067
§ 371 (c)(1),
(2) Date: Aug. 21, 2020

(87) PCT Pub. No.: WO2019/164435
PCT Pub. Date: Aug. 29, 2019

(65) Prior Publication Data
US 2021/0088375 A1 Mar. 25, 2021

(30) Foreign Application Priority Data
Feb. 22, 2018 (SE) .................... 1850197-3

(51) Int. Cl.
*G01G 19/02* (2006.01)
*G01G 19/03* (2006.01)
*G01G 19/387* (2006.01)

(52) U.S. Cl.
CPC ......... *G01G 19/035* (2013.01); *G01G 19/024* (2013.01); *G01G 19/387* (2013.01)

(58) Field of Classification Search
CPC .. G01G 19/022; G01G 19/024; G01G 19/045; G01G 19/047; G01G 19/035
See application file for complete search history.

(56) References Cited

U.S. PATENT DOCUMENTS 3,446,299 A * 5/1969 Leonowicz ............ G01G 3/147
708/445
4,049,069 A 9/1977 Tamamura et al.
(Continued)

FOREIGN PATENT DOCUMENTS

FR 2845156 A1 4/2004
FR 2932260 A1 12/2009
(Continued)

OTHER PUBLICATIONS

Computer translation of the description of FR 2932260 A1 downloaded grom the EPO website on Aug. 26, 2022.*
(Continued)

*Primary Examiner* — Randy W Gibson
(74) *Attorney, Agent, or Firm* — Jeffri A. Kaminski; Venable LLP

(57) ABSTRACT

The present invention relates to a device for determining a weight of a vehicle, the device being configured to: obtain a set of weights derived from in-motion weighing of the vehicle on a weighing bridge, wherein each weight in the set of weights represents one or more axle weights of the vehicle; select one or more weights in the set of weights such that the one or more selected weights together represent all axles of the vehicle and each axle of the vehicle is only represented once; determine a total weight of the vehicle based on the one or more selected weights. Furthermore, the invention also relates to a system and corresponding methods.

16 Claims, 10 Drawing Sheets

(56) References Cited

U.S. PATENT DOCUMENTS

| | | | | |
|---|---|---|---|---|
| 4,347,903 A * | 9/1982 | Yano | ............... | G01G 23/3707 |
| | | | | 708/445 |
| 5,226,496 A * | 7/1993 | Feinland | ......... | G07B 17/00362 |
| | | | | 177/25.15 |
| 5,300,736 A * | 4/1994 | Ehrhardt | ............... | G01G 15/00 |
| | | | | 177/12 |
| 5,308,930 A * | 5/1994 | Tokutu | ............... | G01G 11/046 |
| | | | | 177/164 |
| 5,585,604 A * | 12/1996 | Holm | ............... | G01G 19/035 |
| | | | | 177/133 |
| 5,773,766 A * | 6/1998 | Kinoshita | ........... | G01G 19/022 |
| | | | | 177/134 |
| 5,998,741 A | 12/1999 | Beshears et al. | | |
| 6,137,066 A | 10/2000 | Wånelid | | |
| 6,459,050 B1 | 10/2002 | Muhs et al. | | |
| 2006/0137914 A1* | 6/2006 | Hodac | ............... | G01M 5/0041 |
| | | | | 702/175 |

FOREIGN PATENT DOCUMENTS

| | | | |
|---|---|---|---|
| WO | 2013187799 | A2 | 12/2013 |
| WO | 2017164796 | A1 | 9/2017 |

OTHER PUBLICATIONS

International Search Report and Written Opinion in corresponding International Application No. PCT/SE2019/050067 dated Mar. 19, 2019 (9 pages).

Extended European Search Report in corresponding European Application No. 19757087.2 dated Oct. 18, 2021 (7 pages).

\* cited by examiner

| Weighing case | Number of axles | Weigh bridge length (m) | Total weight (ton) | Total error prior art (kg) | Total error the invention (kg) | Improvement factor | Fig. |
|---|---|---|---|---|---|---|---|
|  | 7 | 6 | 56 | 820 | 80 | 10 | Fig. 7 |
|  | 7 | 12 | 56 | 630 | 28 | 22 | Fig. 6 |
|  | 7 | 6 | 56 | 570 | 160 | 3,6 | Fig. 8 |
|  | 3 | 6 | 24 | 140 | 56 | 2,5 | Fig. 4 |

DEVICE FOR DETERMINING A WEIGHT OF A VEHICLE AND METHODS THEREOF

CROSS-REFERENCE TO RELATED APPLICATIONS

This application is a U.S. National Stage application of PCT/SE2019/050067, filed Jan. 29, 2019 and published on Aug. 29, 2019 as WO 2019/164435, which claims the benefit of Swedish Patent Application No. 1850197-3, filed Feb. 22, 2018, all of which are hereby incorporated by reference in their entireties.

TECHNICAL FIELD

The present invention relates to a device for determining a weight of a vehicle. Furthermore, the present invention also relates to a system comprising such a device and corresponding methods.

BACKGROUND

Road vehicles or railway vehicles are typically weighed to determine that the weight does not exceed limitations set by regulators, such as maximum vehicle total weight or maximum vehicle axle load on roads, railroads or bridges. Another typical application is to determine the cargo weight of the loaded vehicle.

A first group of conventional systems comprise weighing scales with relatively short weighing bridge, i.e. shorter than the wheelbase of the vehicle. These systems typically have a weighing bridge with a length of <1 m, shorter than the typical distance between axles (≈1.3 m) of a bogie of a common vehicle such as lorry and/or a truck; and monitor or weigh the weight of one axle at a time. The weight of each individual axle and the total weight of the vehicle can be determined by weighing multiple times and combining the results. A problem with these scales is the bad accuracy, where the error at the best conditions may be in the range of ±1% on average and at worse conditions as high as ±8%.

A second group of conventional systems comprise weighing scales with a relatively long weighing bridge, i.e. relative to the wheelbase of the vehicle, where more than one vehicle axle may be on the weighing bridge simultaneously. For these scales, when used as weigh in-motion scales, there is a problem of finding the correct weight of each individual axle and the total weight of the vehicle.

In U.S. Pat. No. 6,459,050 B1 a method is described for converting in-ground static weighing scales to a dynamic scale for vehicles.

SUMMARY

An objective of embodiments of the present invention is to provide a solution which mitigates or solves the drawbacks and problems of conventional solutions.

A further objective of embodiments of the present invention is to provide more accurate total weight of a vehicle at in-motion weighing compared to conventional solutions.

The above objectives are solved by the subject matter of the independent claims. Further advantageous embodiments of the present invention can be found in the dependent claims.

According to a first aspect of the invention, the above mentioned and other objectives are achieved with a device for determining a weight of a vehicle, the device being configured to:

obtain a set of weights derived from in-motion weighing of the vehicle on a weighing bridge, wherein the weighing bridge accommodates two or more axles of the vehicle, and wherein the set of weights comprises: a weight representing a first single axle, a weight representing a second single axle, and at least one weight representing two or more axles of the vehicle;

select one or more weights in the set of weights such that the one or more selected weights together represent all axles of the vehicle and each axle of the vehicle is only represented once;

determine a total weight of the vehicle based on the one or more selected weights.

A vehicle in this context may, e.g. be a road vehicle, such as a truck, a bus, a dumper, or a car. In addition, a vehicle may be a railed vehicle such as a train or a tram. The vehicle should have at least one axle.

The obtained set of weights may be weight data from the in-motion weighing of the vehicle. The set of weights may be derived from weight data which are the result of sampling and further signal processing of weight signals generated at the in-motion weighing event.

That a weight represents one or more axle weights of the vehicle can mean that the weight is the value presented by the scale when the one or more axle weights of the vehicle are alone, at a given time period, supported by the weighing bridge and no other axles involved.

Each weight in the set of weights is selected such that certain conditions are fulfilled, i.e. the one or more selected weights together represent all axles of the vehicle and each axle of the vehicle is only represented once. Therefore, it can be understood that weights one by one are selected from the set of weights and for each selected weight the above conditions are checked. For example, the present algorithm can work like: select a first weight from the set of weights and check if the one or more selected weights together represent all axles of the vehicle and furthermore check each axle of the vehicle is only represented once; if the answer is Yes, determine the total weight of the vehicle based one the first selected weight. Else, select a second weight from the set of weights and check if the conditions are fulfilled; if Yes determine the total weight of the vehicle based one the first and second selected weights. Else, select a third weight from the set of weights and check if the conditions are fulfilled; if Yes determine the total weight of the vehicle based one the first, second and third selected weights. Else, select a fourth weight from the set of weights and continue these steps until the conditions are fulfilled.

The order of selection of weights are determined by different selection rules that can be combined. These selection rules are defined in embodiments of the invention.

The device according to the first aspect provides a number of advantages. One such advantage is that the total weight of the vehicle is determined from a set of weights where each weight represents axle forces (acting on the weighing bridge) from a constant number of axles and not forces from the time instance when axles are in the process of entering or leaving the weighing bridge. Thereby, improved accuracy for determining the total weight of the vehicle is possible compared to conventional solutions. Another advantage is that the weights are selected such that disturbing forces which will cause weighing errors can be minimized. This also means improved accuracy.

In an embodiment of the first aspect, the device according to the first aspect is configured to determine the total weight of the vehicle based on a combination of the one or more selected weights.

An advantage with this embodiment is that weights with the best/highest quality can be selected in the combination, for instance omitting weights composed of too few recording samples, selecting weights with the minimum amount of mechanical disturbances, etc.

The one or more selected weights can be combined in many different ways, e.g. involving arithmetic operations.

In an embodiment of the first aspect, the combination is a sum of the one or more selected weights.

An advantage with this embodiment is that the total weight can be derived for weighing cases when the wheel base of the vehicle is longer than the length of the weighing bridge. In this case several weights are often available from which a total weight can be derived by adding them together.

In an embodiment of the first aspect, the device according to the first aspect is configured to
select a weight in the set of weights representing the most number of axles of the vehicle.

The weight in the set of weights representing the most number of axles of the vehicle is in one case selected before selecting any other weight in the set of weights. Therefore, this selection rule has in one case the highest priority amongst different selection rules.

An advantage with this embodiment is that the weight selected with the most number of axles will minimize the number of weights needed to determine the total weight of the vehicle and thereby the error associated with the intrinsic accuracy of the scale is also minimized.

In an embodiment of the first aspect, the device according to the first aspect is configured to
select a weight in the set of weights representing any of non-split vehicle, non-split chassis, single axle or non-split bogie and split bogie.

An advantage with this embodiment is that those weighing errors will be minimized which are associated with e.g. the mechanical arrangement of the wheel suspensions of the vehicle and the condition of the surrounding road and aprons. This means improved accuracy.

This embodiment expresses a type of selection rules which are dependent on the axle configuration of the vehicle and the length of the weighing bridge. The length of the weighing bridge can be expressed in physical units, such as in meters, but can also be expressed in number of samples which forms the basis for the weights in the set of weights.

In an embodiment of the first aspect, the device according to the first aspect is configured to
select a weight representing non-split vehicle before selecting a weight representing non-split chassis, single axle or non-split bogie and split bogie.

An advantage with this embodiment is related to the weighing case when the length of weighing bridge is longer than the wheel base of the vehicle, i.e. the entire vehicle is supported by the weighing bridge, and hence all errors disappear which are associated with e.g. wheel suspensions, rolling frictions, redistribution of load between axles, and speed variations of the vehicle. This means improved accuracy.

In an embodiment of the first aspect, the device according to the first aspect is configured to
select a weight representing non-split chassis before selecting a weight representing single axle or non-split bogie and split bogie.

An advantage with this embodiment is when the vehicle is composed of two or more chassis or rigid units where all wheels of only one of the chassis fit on the weighing bridge at a time and hence those errors will be minimized which are associated with wheel suspensions of the chassis. This means improved accuracy.

In an embodiment of the first aspect, the device according to the first aspect is configured to
select a weight representing single axle or non-split bogie before selecting a weight representing split bogie.

An advantage with this embodiment is when not all wheels of one chassis fit on the weighing bridge during a time interval. Weighing errors caused by e.g. frictional forces between the individual axles in the wheel suspension will be minimized with this embodiment. This means improved accuracy.

In an embodiment of the first aspect, the device according to the first aspect is configured to
select weights in the set of weights based on a quality metric associated with each weight.

An advantage with this embodiment is that weights in the set of weights can be avoided even though they have been correctly selected by the prescribed selection rules herein. The numerical value of the selected weight can exhibit bad quality, meaning that the value cannot be trusted for various reasons. Thereby, improved accuracy is possible for determining the total weight of the vehicle.

In an embodiment of the first aspect, wherein the quality metric is associated with at least one of weight oscillation, number of relevant samples associated with a weight, inclination in an apron associated with the weighing bridge, manipulation of axle load distribution, unevenness in an approaching road of the weighing bridge, variations of rolling frictions against the approaching road of the weighing bridge, and a variation in the speed of the vehicle over the weighing bridge.

An advantage with this embodiment is that improved accuracy is possible since other parameters influencing the weighing accuracy are also considered.

The number of relevant samples associated with a weight in the set of weights are those samples recorded during a weighing time period where no axle is entering or leaving the weighbridge.

The inclination in the apron corresponds to the angle between the driving surface plane of the aprons and surface plane of the weighing bridge The manipulation of the axle load distribution can be performed by the driver of the vehicle during the passage over the weighing bridge. The driver can manually shift the load from one axle to the others in the axle group (bogie).

In an embodiment of the first aspect, each weight in the set of weights is derived when no wheel of the vehicle enters or leaves the weighing bridge so that the number of axles supported by the weighing bridge is constant for the weight.

An advantage with this embodiment is that all weights used from the set of weights are well defined and always representing entire axle weights and not fractions of axle weights. This means improved accuracy.

In an embodiment of the first aspect, each weight in the set of weights is derived from sampled weight values when the number of axles supported by the weighing bridge is constant for the weight.

An advantage with this embodiment is that all samples that constitute a weight in the set of weights are ensured to represent the entire axle weight and not fractions of the axle weight. This means improved accuracy.

In an embodiment of the first aspect, each weight in the set of weights is an average value of sampled weight values when the number of axles supported by the weighing bridge is constant for the weight.

An advantage with this embodiment is that the variations in the sampled weight values, caused for instance by oscillations, can be smoothed out. This means improved accuracy.

In an embodiment of the first aspect, all weights in the set of weights are derived from the same in-motion weighing event.

According to a second aspect of the invention, the above mentioned and other objectives are achieved with a system comprising a weighing bridge and a device according to the first aspect.

According to a third aspect of the invention, the above mentioned and other objectives are achieved with a method for determining a weight of a vehicle, the method comprising:

obtaining a set of weights derived from in-motion weighing of the vehicle on a weighing bridge, wherein the weighing bridge accommodates two or more axles of the vehicle, and wherein the set of weights comprises: a weight representing a first single axle, a weight representing a second single axle, and at least one weight representing two or more axles of the vehicle;

selecting one or more weights in the set of weights such that the one or more selected weights together represent all axles of the vehicle and each axle of the vehicle is only represented once;

determining a total weight of the vehicle based on the one or more selected weights.

The method according to the third aspect can be extended into embodiments corresponding to the embodiments of the device according to the first aspect. Hence, an embodiment of the method comprises the feature(s) of the corresponding embodiment of the device.

The advantages of the methods according to the third aspect are the same as those for the corresponding embodiments of the device according to the first aspect.

The invention also relates to a computer program, characterized in program code, which when run by at least one processor causes said at least one processor to execute any method according to embodiments of the present invention. Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
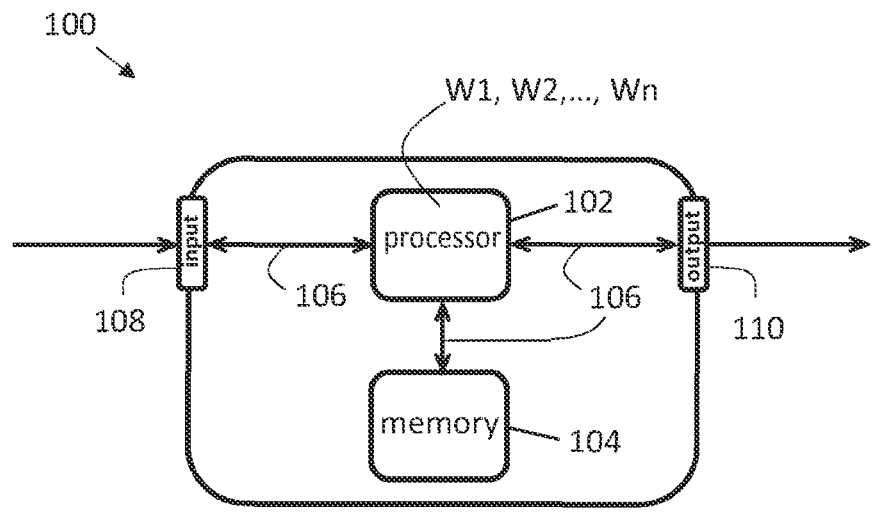
FIG. 1 shows a device according to an embodiment of the invention.

FIG. 1 shows a device 100 for determining a total weight of a vehicle according to an embodiment of the invention. The device 100 can be implemented in a number of different ways. For example, as a software implementation, a hardware implementation, or a combination of software and hardware implementation.

The device 100 for determining a weight of a vehicle in FIG. 1 comprises at least one processor 102 and an internal or external memory 104. The memory 104 may store program code that, when being executed, causes the processor 102 of the device 100 to perform the functions and actions described herein. That the device 100 is configured to perform certain actions should in this disclosure be understood to mean that the device 100 comprises suitable means, such as e.g. the processor 102 and the memory 104, configured to perform said actions. The device 100 may further comprise input means 108 and output means 110 for reception and transmission, respectively, of signals carrying information or data using suitable communication protocols. The different elements or units of the device 100, such as the processor 102, the memory 104, the input means 108 and the output means can be connected to each other by communication means 106 known in the art.

Figure 3:
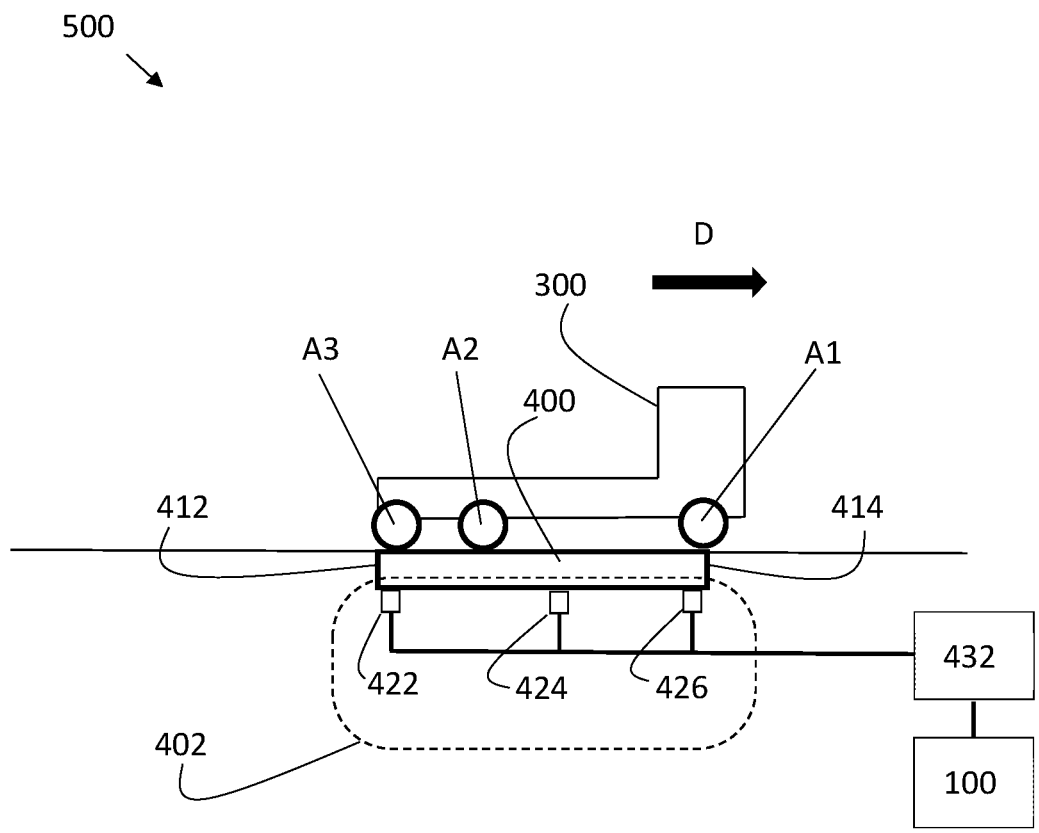
FIG. 3 shows a system according to an embodiment of the invention.

The device 100 herein is configured to obtain a set of weights W1, W2, . . . , Wn (where n is an index integer) derived from in-motion weighing of the vehicle 300 (see FIG. 3) on a weighing bridge 400 (see FIG. 3). Each weight in the set of weights W1, W2, . . . , Wn represents one or more axle weights of the vehicle 300. The device 100 is configured to select one or more weights in the set of weights W1, W2, . . . , Wn such that the one or more selected weights together represent all axles of the vehicle 300 and each axle of the vehicle 300 is only represented once. The device 100 is configured to determine a total weight Wt of the vehicle 300 based on the one or more selected weights.

Figure 2:
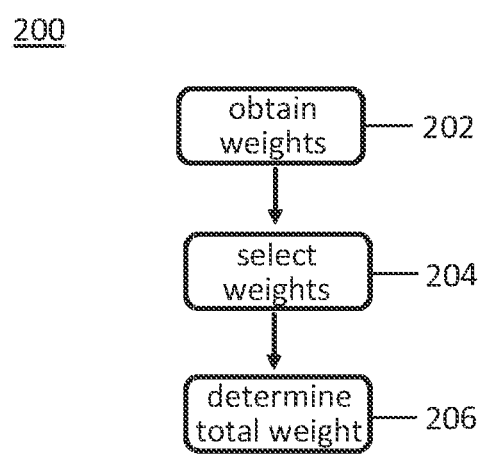
FIG. 2 shows a method according to an embodiment of the invention.

FIG. 2 shows a flow chart of a corresponding method 200 that may be executed, e.g. in the device 100 shown in FIG. 1. The method 200 comprises (202) obtaining a set of weights W1, W2, . . . , Wn derived from in-motion weighing of the vehicle 300 on a weighing bridge 400. Each weight in the set of weights W1, W2, . . . , Wn represents one or more axle weights of the vehicle 300. The method 200 further comprises (204) selecting one or more weights in the set of weights W1, W2, . . . , Wn such that the one or more selected weights together represent all axles of the vehicle 300 and each axle of the vehicle 300 is only represented once. The method 200 further comprises (206) determining a total weight Wt of the vehicle 300 based on the one or more selected weights.

According to an embodiment of the invention the total weight Wt of the vehicle 300 is determined based on a combination of the one or more selected weights. The combination may be a sum of the one or more selected weights according to an embodiment.

FIG. 3 shows a weighing system 500 for in-motion weighting. The weighing system 500 comprises a device 100 for determining the weight of a vehicle 300 and a weighing bridge 400 with its associated weighing circuit 402. The exemplary vehicle 300 in FIG. 3 comprise 3 axles, i.e. a first axle A1, a second axle A2 and a third axle A3. Further, mentioned weighing circuit 402 may comprise a number of load sensors. In the example in FIG. 3, the weighing circuit 402 comprises a first set of load sensors 422, a second set of load sensors 424 and a third set of load sensors 426. Each set of load sensors is coupled to a weight indicator 432. The first set of load sensors 422 is arranged at the first side 412 of the weighing bridge and the third set of load sensors 426 is arranged at the second side 414 of the weighing bridge 400. The vehicle 300 passes over the weighing bridge 400 in the driving direction D from the first side 412 to the second side 414, causing weight signals to be generated by the load sensors. These weight signals can be transferred to the weight indicator 432 for processing which is coupled to the weighing circuit 402. The weight indicator 432 is further coupled to the device 100 in this example. Hence the device 100 is in this case a standalone device. However, the device 100 may in embodiments be part of the weight indicator 432 or any other another device of the weighing system 500.

At in-motion weighing of a vehicle 300, the weighing system 500 must automatically deliver a weighing result as soon as the vehicle 300 has passed over the weighing bridge 400. This in contrast to conventional static vehicle weighing where a human hand pushes a button deciding when the monitored weight value is acceptable. The in-motion weighing system computes a total weight Wt out of all recorded weighing data sampled during the passage over the weighing bridge 400.

Each weight in the set of weights W1, W2, . . . , Wn is according to an embodiment derived during time periods when no wheel of the vehicle 300 enters or leaves the weighing bridge 400 so that the number of axles supported by the weighing bridge 400 is constant for a (every) weight in the set of W1, W2, . . . , Wn. Usually analogue weight signals are generated by load sensors which means that sampling of the analogue weight signals is introduced so as to obtain digital representation. The sampling can be performed according to methods known in the art. Therefore, each weight in the set of weights W1, W2, . . . , Wn is derived from sampled weight values when the number of axles supported by the weighing bridge 400 is constant for the weight. However, also digital weighing system 500 can be used in conjunction with embodiments of the invention.

Each weight in the set of weights W1, W2, . . . , Wn may be an average value of sampled weight values when the number of axles supported by the weighing bridge 400 is constant for the weight. It is assumed that all weights in the set of weights W1, W2, . . . , Wn are derived from the same in-motion weighing event.

Figure 4:
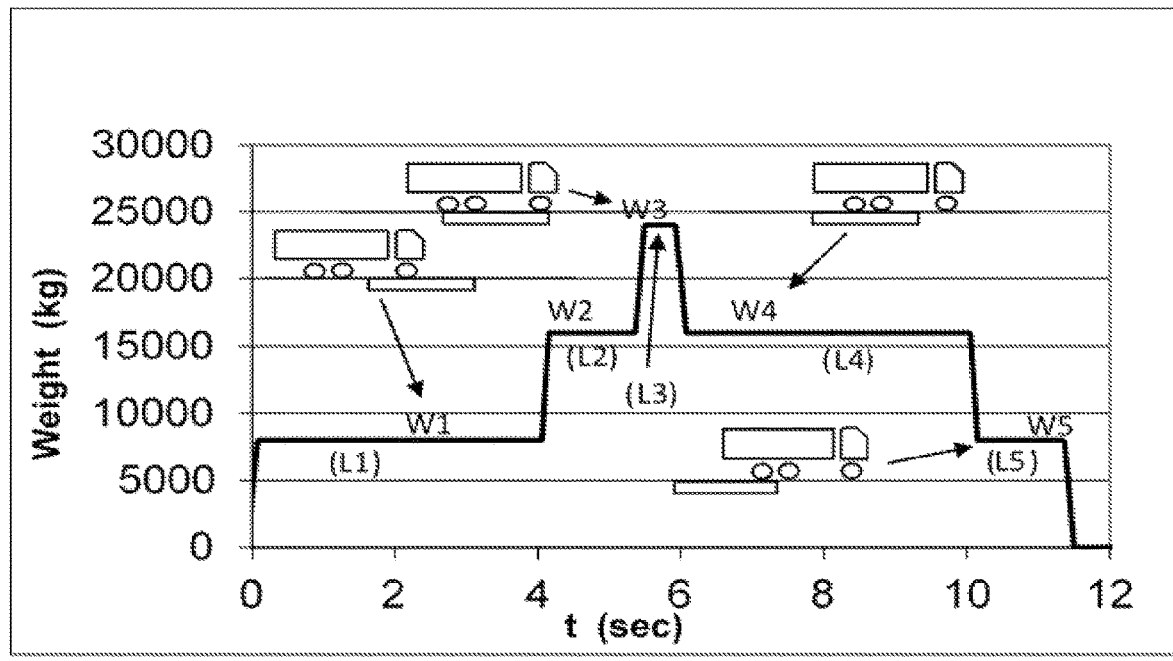
FIG. 4 illustrates different plateau weights.

FIG. 4 shows an example where a 3-axle vehicle 300 is driving over a 6 m long weighing bridge 400 with a speed of 1 m/s. The x-axis in FIG. 4 shows the time in seconds (s) and the y-axis shows the monitored or recorded weight in kg. The weighing system 500 monitors or records the weight of the vehicle 300 during the passage over the weighing bridge 400 and a weighing curve is presented or generated as illustrated in FIG. 4. The weighing curve comprises five different horizontal levels L1, L2 . . . L5 with constant weight, hereafter also called plateaus. An averaging of the sampled weighing data, or some other suitable arithmetic operation, over each plateau interval is made for every plateau L1, L2 . . . L5 resulting in corresponding weight values W1, W2 . . . W5, respectively, hereafter called plateau weights. Thus, weight value W1 is the numerical computed weight representing axle1 (front axle), weight value W2 is the numerical computed weight representing axle1+axle2, weight value W3 is the numerical computed weight representing axle1+axle2+axle3, and W4 is the numerical computed weight representing axle2+axle3, and W5 is the numerical computed weight representing axle3. A plateau weight is a weight in the set of weights W1, W2, . . . , Wn in this case.

Associated with each plateau weight W1, W2 . . . W5, a weighing error is emanating from different error sources, such as vehicle oscillations and axle weight redistribution during the drive, resulting in a large spread in the error magnitude among the different plateau weights and thus they have very different quality. More about the quality of each weight is discussed in the following disclosure.

Hereafter it is defined an axle group or bogie of a vehicle 300 as comprising of two or more axles which are closely spaced and mechanically linked together, e.g. linked together in the truck suspension. For an ordinary truck the axle spacing internally in the axle group is typically 1.1 m to 1.8 m and the spacing to the next axle or axle group is typically 3 m to 7 m. In all the examples of the following FIGS. the axle weight of all vehicles is chosen to be 8 tons.

In the example in FIG. 4, the weighing bridge 400 length is too short in relation to the wheel base of the vehicle 300, which result in a very short plateau L3 (in time units) implying low quality for this plateau L3. Generally, the length in time or time duration should exceed one period of an oscillation according to an embodiment. The corresponding plateau weight W3 is therefore not trustable and might be discarded. If plateau weight W3 is discarded, the total weight Wt can be computed from the remaining weights W1, W2, W4, and W5. To use the sum of W2 and W5 for computing the total weight Wt is one possibility. However, both these values are heavily disturbed by the errors mentioned earlier. These errors appear when the axles in an axle group or bogie are weighed separately, hereafter called split-bogie weighing (see also further description about split-bogie weighing in the following disclosure). The first time this disturbance happens in the example in FIG. 4 is for weight W2, when the first bogie-axle (axle2) is carried by the weighing bridge 400 and the second bogie-axle (axle3) is carried by the approaching road, and the second time for weight W5, when second bogie-axle (axle3) is carried by the weighing bridge 400 and the first bogie-axle (axle2) is carried by the approaching road. Using plateau weights not comprising all the individual axles of the group should generally be avoided if a better alternative is available. Otherwise, the errors of the determined total weight Wt can be hundreds of kg to more than thousand kg for a steel spring vehicle owing to internal frictions.

Another option for computing the total weight Wt is to use the sum of weights W1 and W4 for determining the total weight Wt, which will provide the total weight with the smallest errors in this case. The reason for this small error is the large distance between the axle and axle group (bogie) in relation to the axle spacing within the bogie. This is also why the plateaus L1 and L4 have a long time duration compared to other plateaus in FIG. 4. This implies that they offer corresponding plateau weights W1 and W4 with good quality even with oscillations. The total weight Wt can according to this option be expressed as Wt=W1+W4 and is the second-best option when weight W3 is not trustable.

A selection method for calculating the total weight TW of the vehicle 300 for the case illustrated in FIG. 4 can now be formulated as follows:

Priority 1: The first choice is to use weight W3 formed when the entire vehicle 300 fits on the weighing bridge 400, i.e. Wt=W3. However, in FIG. 4 plateau 3 is not trustable due to its very short time duration (very few samples).

Priority 2: The second choice is to compute the sum of two or more plateau weights containing one or more axle groups alternatively, as in this case, comprising axle group and axle, i.e. Wt=W1+W4.

Priority 3: Third choice, if no other option available, e.g. due to poor quality on weights W3, W1 and W4, is to choose some of remaining weights available for the sum which now must be derived from split-bogie weighing, i.e. Wt=W2+W5.

In the selection method above, Priority 3 is an example of split-bogie weighing, see the sketch pointing at plateau L5 in FIG. 4. This weight often includes large errors and should be avoided. A way of finding out which of the plateaus L1, L2, ..., L5 represent split-bogie weighing is to measure the length in time (time duration) of each plateau and by use of vehicle speed convert it to length in meters. By comparing these plateau lengths with each other, the plateaus containing a split axle can be identified. In this case, plateau L2 and L5 of FIG. 4 are split-bogie weighings. Hence, weights W2 and W5 will be labeled as weights representing split-bogie weighing comprising axles from split-bogie weighing and should be avoided; whilst weights W1 and W4 do not contain any split axles and will be labeled as weights representing non-split bogie weighing.

Figure 7:
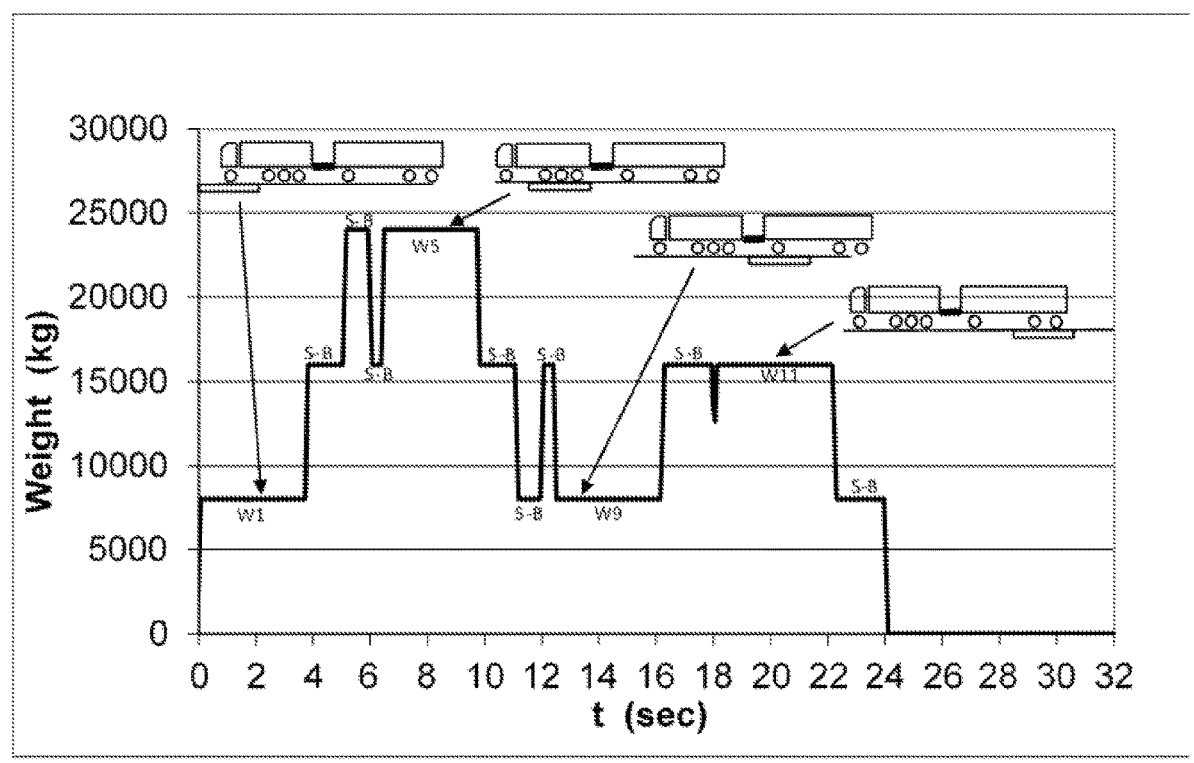
FIG. 7 illustrates split bogie and non-split bogie weighing.
Figure 8:
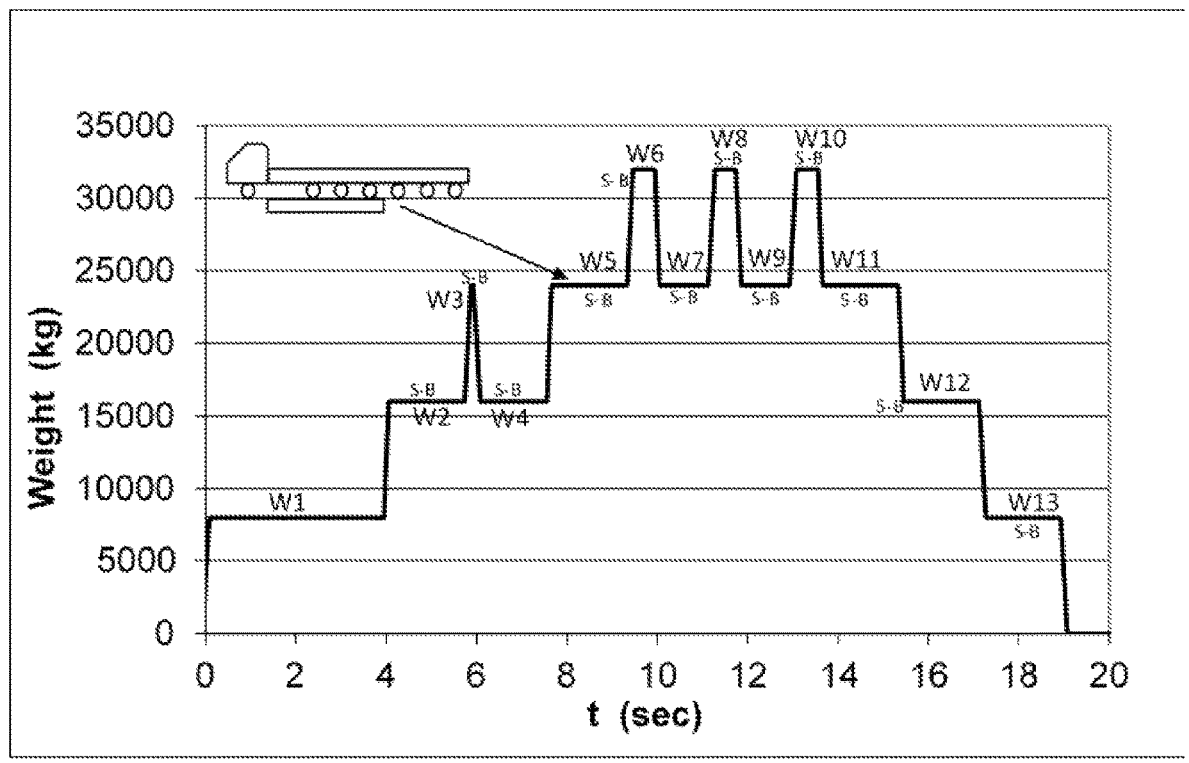
FIG. 8 illustrates split bogie and non-split bogie weighing.

FIGS. 7 and 8 illustrate split-bogie weighing plateaus which are identified and marked with "S-B". In FIG. 7 all except four of the plateaus are split-bogie weighings and in FIG. 8, all plateaus except the first are split-bogie weighings. In FIG. 7 a 7-axle truck with a trailer is driving over a 6 m long weighing bridge 400 with a speed of 1 m/s. In FIG. 8 a 7-axle truck without a hanger is driving over a 6 m long weighing bridge 400 with a speed of 1 m/s.

Figure 6:
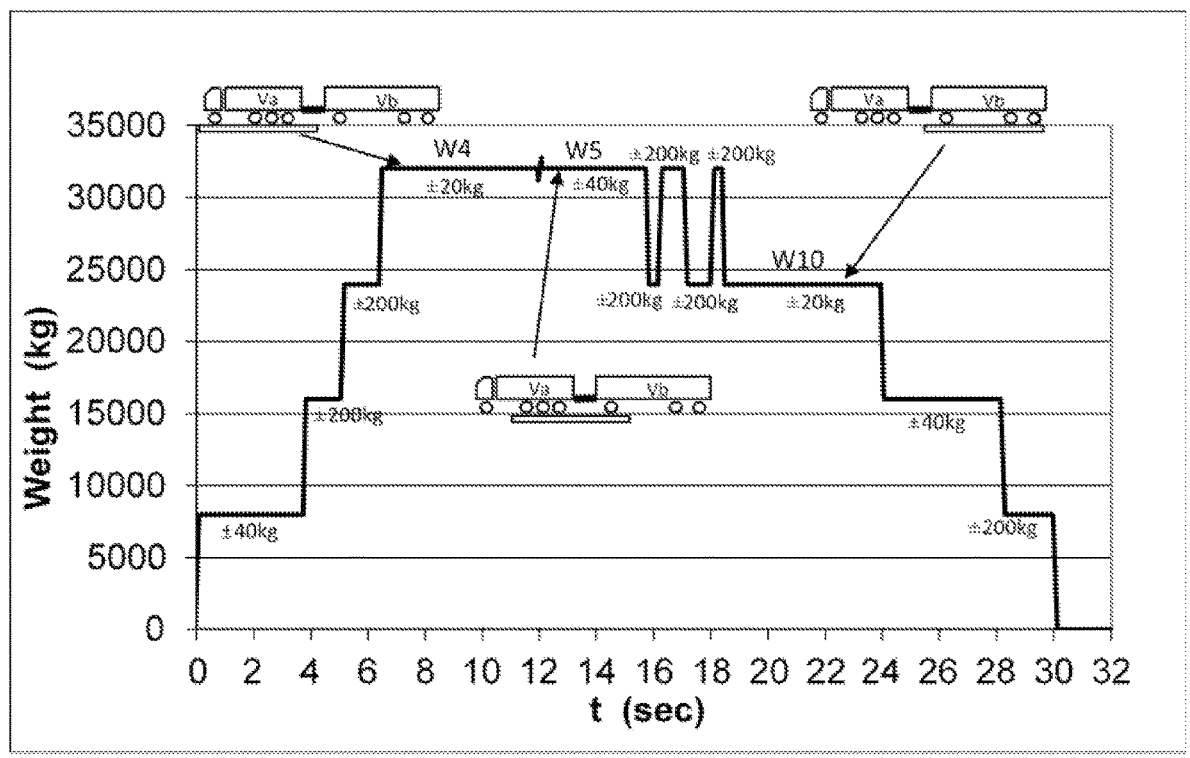
FIG. 6 illustrates non-split and split chassis weighing.

In order to give a more generalized formulation of the present selection method where weights are selected from the set of weights W1, W2, ..., Wn, the expression split chassis weighing is also herein defined (see also further description about split chassis weighing in the following disclosure). A vehicle 300 can comprise of one or several separate rigid units, which are mechanically linked by a pulling mechanism. FIG. 6 illustrates this case with rigid units Va and Vb. In the example in FIG. 6 a vehicle 300 is driving over a 12 m long weighing bridge 400 creating several plateaus in the weighing curve and where the two weight values W4 and W10 both represent the weight of the entire rigid unit Va and Vb, respectively. These weights are defined as representing non-split chassis weighings while weight W5 is defined as representing a split chassis weighing. In order to avoid disturbing internal forces between axle and axle groups of the vehicle unit Va or Vb a non-split chassis weighing should be prioritized because internal forces between axle and axle groups of a single rigid vehicle unit have a very weak mechanical coupling to the neighboring rigid units.

A way of finding out which of the weights represent split chassis weighing is to measure the length in time or number of samples of each weight or it corresponding plateau in the similar manner as for split bogie weighing. By comparing these weight lengths with each other the weights including a split chassis weighing can be identified.

According to embodiments of the invention a method for determining the total weight Wt of a vehicle 300 can be formulated which also considers the quality or quality metric associated with each weight in the set of weights (see e.g. plateau 3 in the example in FIG. 4). The overall objective according to this embodiment is to receive a weighing result using as few plateau weights as possible which at the same time are of highest available quality which improves the accuracy of the estimated total weight Wt. The total weight Wt of the vehicle 300 is estimated or determined by summing up at least one of the plateau weights under the condition that all axles of the vehicle 300 are included in the sum and no axle weight is to be added more than once and furthermore the plateau weights used hold the best available quality or highest quality metric. One reason is that it has been realized by the inventor that associated with each weight in the set of weights W1, W2, ..., Wn a weighing error is emanating from different error sources. Therefore, according to embodiments of the invention the device 100 is configured to select weights in the set of weights W1, W2, ..., Wn also based on a quality metric associated with each weight. The main error sources are associated with at least one of weight oscillation, number of relevant samples associated with a weight, inclination in an apron associated with the weighing bridge 400, manipulation of axle load distribution by driver, unevenness in an approaching road of the weighing bridge 400, variations of rolling frictions against the approaching road of the weighing bridge 400, and a variation in the speed of the vehicle 300 over the weighing bridge 400. Also, other quality metrics can be considered when determining the total weight Wt so as to provide refined weight determination.

Figure 5:
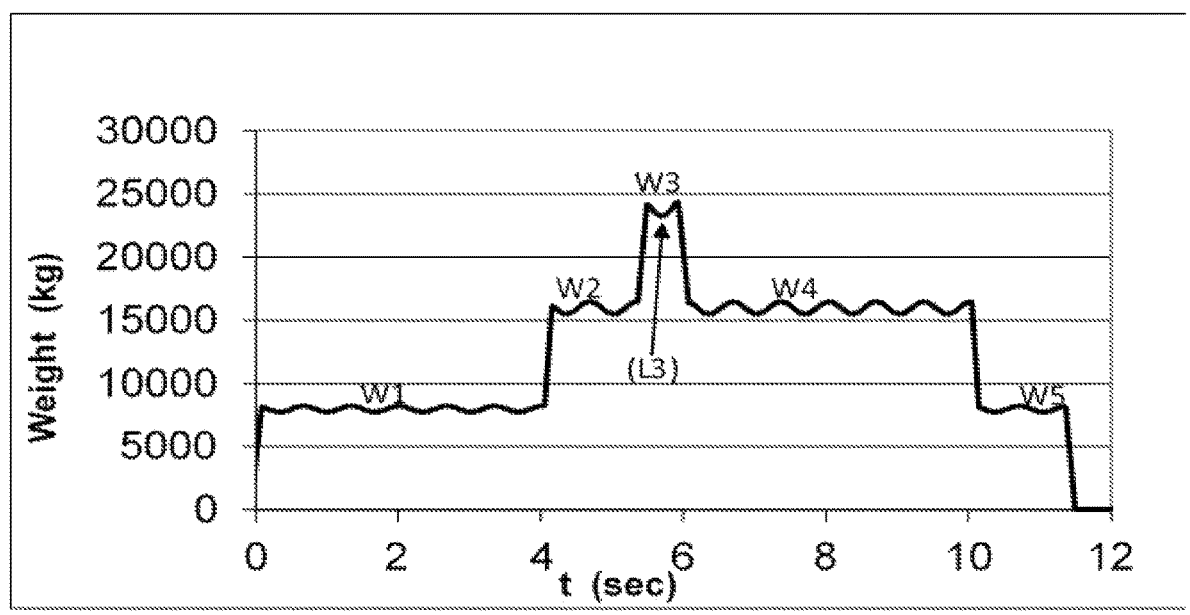
FIG. 5 illustrates oscillation errors.

In this respect FIG. 5 illustrates the case when oscillations are added to the weighing plateaus of FIG. 4. The vehicle 300 is the 3-axle truck driving over a 6 m long weighing bridge 400 with a speed of 1 m/s as in FIG. 4. The oscillations are 1.5 Hz having an amplitude of 3%. The length of the plateau L3 is very short and with oscillations added a reliable plateau weight is not possible to compute. Hence, L3 is labelled as a low-quality plateau and will get a low priority even though it from start had the highest priority, i.e. representing all axles of the vehicle 300. In similar manner all other weights will get an associated quality metric.

Depending on circumstances it might sometimes be necessary to use plateaus from mixed priorities. Below are some examples of using these priority rules.

Example 1

Compute the total weight Wt for the weighing shown in FIG. 7. Here Priority 1 selection is not available, so Priority 2 selection is used according to:
Select the first plateau weight with highest number of axles and highest priority available, i.e. select W5.
Select the second plateau weight with highest number of axles and highest priority available, i.e. select W11.
Select the third plateau weight with highest number of axles and highest priority available, i.e. select W1.
Select the fourth plateau weight with highest number of axles and highest priority available, i.e. select W9.

It can be noted that plateaus marked with "S-B" in FIG. 7 are discarded in the selection process due to the low reliability. All axles are represented in the sum of the selected weights and no axle is represented more than once so the condition is fulfilled. Hence, the total weight Wt becomes in this example: Wt=W1+W5+W9+W11

Example 2

Compute the total weight for the weighing shown in FIG. 8. Here all plateaus are of Priority 3 except W1 so the selection is according to:

Select the first plateau weight with highest number of axles and highest priority available, i.e. select W6.

Select the second plateau weight with highest number of axles and highest priority available, i.e. select W12.

Select the third plateau weight with highest number of axles and highest priority available, i.e. select W1.

It can be noted that plateaus marked with "S-B" in FIG. 8 now have to be used in the selection process due to the fact that no other option is available. All axles are now represented among the selected weights and no axle is represented more than once so the condition of the present selection method is fulfilled. Hence, a first total weight Wt1 becomes in this example: Wt1=W1+W6+W12. However, there are five more options to derive a sum for the total weight Wt which still fulfils the condition herein. With the same procedure as described above the following optional total weights indexed 2 to 6 (Wt2-Wt6) can be determined as:

$$Wt2=W1+W4+W10,$$

$$Wt3=W1+W5+W11,$$

$$Wt4=W1+W4+W9+W13,$$

$$Wt5=W2+W7+W12,$$

$$Wt6=W2+W8+W13.$$

If the quality metric is equally good for all selected weights an average total sum Wtaverage can be computed from all six options by taking the average of the six options, i.e.: Wtaverage=⅙*(Wt1+Wt2+Wt3+Wt4+Wt5+Wt6). The average total sum Wtaverage gives a better determination of the total weight Wt compared to each total weight Wt1-Wt6. It can further be observed that weight W3 has been discarded because of the very short plateau length in this example which implies a very low quality.

The weighing error of a given plateau weight can either be positive or negative. This means that when adding up different plateau weights the errors will partly cancel each other. A standard statistical method, such as RSS (Root Sum Squares) method can be used to handle the error calculation for the total weight Wt. This is done by adding up all plateau weight errors squared and then calculate the square root of the sum. In the following table an error comparison for the total weight is made for two methods, a method according to prior art and the present method for different weighing cases and weighing bridge lengths. The weighing errors in plateau L2 and L5 of FIG. 4 could be as large as up to 1000 kg for a steel spring suspension, but to be conservative it is assumed to be 200 kg. For simplicity of comparison, the measuring errors of each plateau weight are now assumed to be as follows:

Error of split bogie plateaus ±200 kg (example W2 and W5 of FIG. 4)

Error of non-split bogie plateaus ±40 kg (example W1 and W4 of FIG. 4)

Error of non-split chassis plateaus ±20 kg (example W4 and W10 of FIG. 6)

These assumed error spans are in FIG. 6 written under each plateau of the weight curve. The spread in the errors is of course much larger, for instance some of those four very short plateaus at 24 and 32 tons could have error spans of ±1000 kg caused by oscillations and some could have much less.

Figure 11:
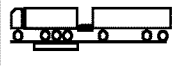
FIG. 11 shows a comparison between a prior art method and a method according to the invention.
Figure 11:
Figure 11:
Figure 11:
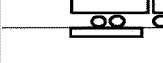

FIG. 11 shows a comparison between a prior art method and a method according to the invention. It is shown in FIG. 11 how the assumed errors will influence the resulting total weight of the vehicle.

Figure 9:
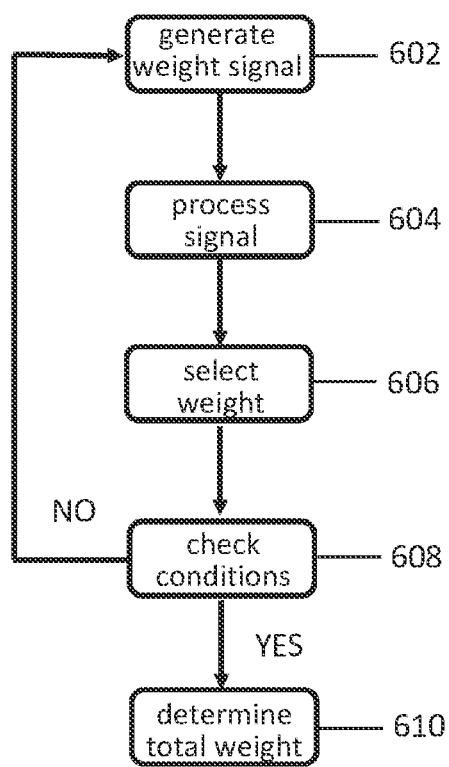
FIG. 9 shows a flow chart of a method according to an embodiment of the invention.

FIG. 9 shows a flow chart of a method 600 according to an embodiment of the invention. The method shown 600 in FIG. 9 comprises steps 602 to 610. The method in FIG. 9 can be implemented in a device 100, such as the one shown in FIG. 1.

At step 602 in FIG. 9, a vehicle 300 passes over a weighing bridge 400 and one or more in-motion weight signals for the vehicle 300 is generated.

At step 604 in FIG. 9, the in-motion weight signals are processed, such that a set of weights W1, W2, . . . , Wt is generated and obtained, e.g. by sampling of the one or more in-motion weight signals.

At step 606 in FIG. 9, one or more weights in the set of weights W1, W2, . . . , Wt are selected according to different selection rules so as to form a set of selected weights comprising one or more selected weights. According to an embodiment the following selection rules are used in the following order at the selection step 606 (see description about no-split vehicle weighing in the following disclosure):

1. Select a weight in the set of weights W1, W2, . . . , Wn representing the most number of axles of the vehicle 300 before selecting any other weight in the set of weights W1, W2, . . . , Wn, thereafter;

2. Select a weight representing non-split vehicle before selecting a weight representing non-split chassis, single axle or non-split bogie and split bogie, thereafter;

3. Select a weight representing non-split chassis before selecting a weight representing single axle or non-split bogie and split bogie, and thereafter;

4. Select a weight representing single axle or non-split bogie before selecting a weight representing split bogie.

Selection rules 1 to 4 above can be repeated any number of times.

It is to be noted that these selection rules can be combined with quality metrics associated with each weight in the set of weights as previously explained and described.

At check point 608 in FIG. 9, for each selected weight the present algorithm checks if the following conditions are fulfilled: do the one or more selected weights together represent all axles of the vehicle 300 and is each axle of the vehicle 300 only represented once? If the answer is YES the algorithm continues to step 610. Else, i.e. NO, the algorithm goes back to the selection step 606 and the selection rules 1 to 4 above are applied.

At step 610 in FIG. 9 the total weight Wt of the vehicle 300 is determined based on the one or more selected weights. As previously mentioned the total weight Wt can be determined based on a combination of the set of selected weights, such as the sum of the selected weights.

Non-Split Vehicle Weighing

A non-split vehicle weighing is defined as the situation where the vehicle 300 has a total wheelbase length shorter than the length of weighing bridge 400, and thereby all the wheels of the vehicle 300, during a time interval, are entirely supported by the weighing bridge 400 at the passage of vehicle over the weighing bridge 400.

Non-Split Chassis

A vehicle 300 can be comprised of one or more separate rigid units, or chassis, which are mechanically coupled together by an essentially torque-free pulling mechanism. Non-split chassis is defined as the situation where one or more of the chassis of the vehicle 300 have a wheelbase shorter than the weighing bridge 400 length, and thereby all the wheels of the chassis are entirely supported by the weighing bridge 400 at the passage of chassis over the weighing bridge 400.

Single Axle or Non-Split Bogie

A single axle is defined as an axle that is not part of a group of axles. The distance between the centres to the closest axle is, e.g. greater than 2 m. Note that the distance between the centres to the closest axle can be longer or shorter than 2 m.

A bogie may be defined as a group of axles with less than a predefined length (e.g. 2 m) between the centres of axles. Single axle or non-split bogie may be defined as the situation where one single axle or all individual axles of the bogie are entirely supported by the weighing bridge 400 at the passage of single axle or bogie over the weighing bridge 400.

Split-Bogie

A bogie is defined as a group of axles, e.g. with less than 2 m between the centres of axles. Split-bogie is defined as the situation, during the passage of bogie over the weighing bridge 400, where at least one individual axle of the bogie is supported by the approaching road outside the weighing bridge 400 and not by the weighing bridge 400 itself.

Figure 10:
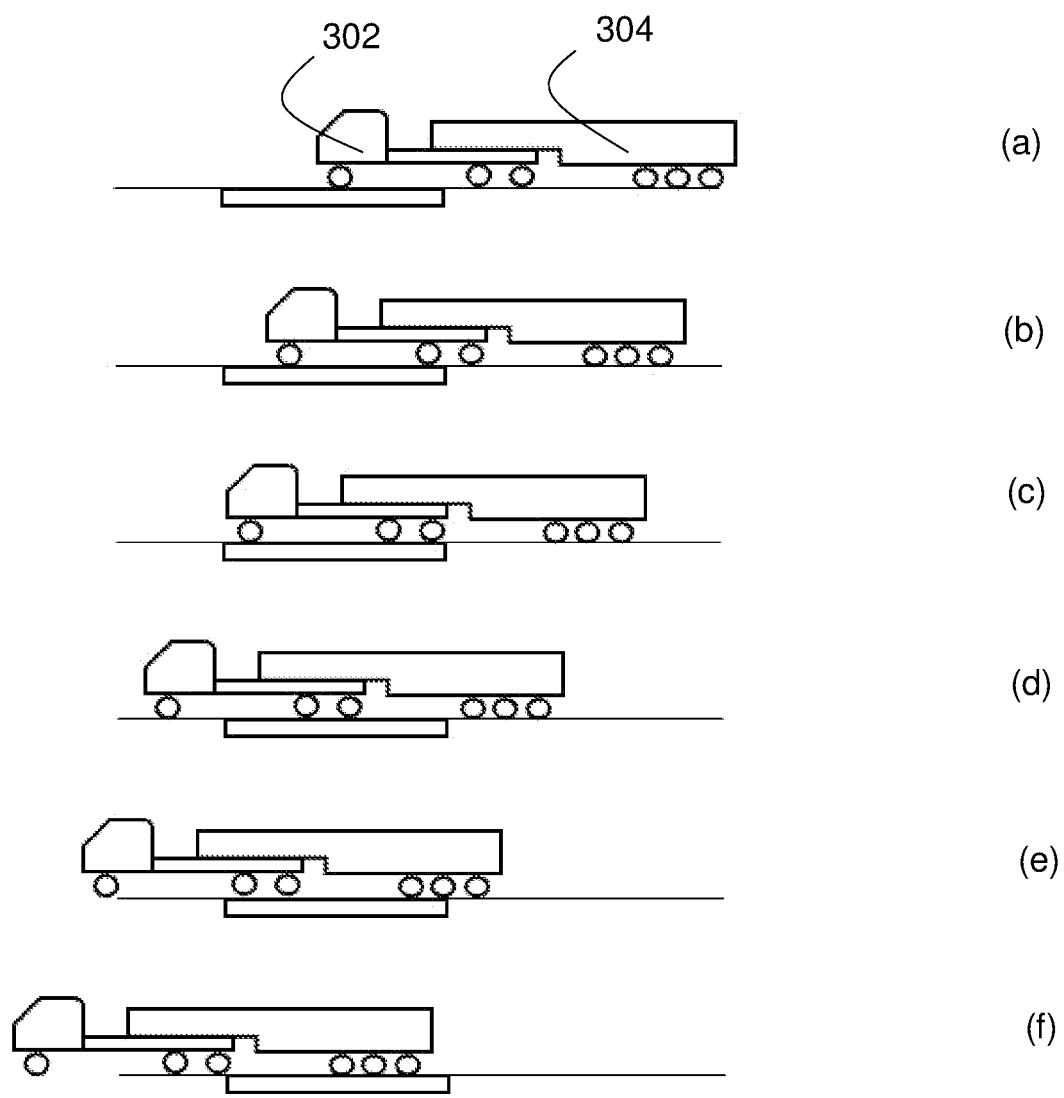
FIGS. 10a-10f illustrate different axle configurations in relation to the length of the weighing bridge.

Example of a vehicle 300 with two chassis mechanically coupled together by an essentially torque-free pulling mechanism is shown in FIG. 10. The first chassis 302 is the pulling truck with 3 axles and the second chassis 304 is the trailer with a bogie consisting of 3 axles. The following cases are illustrated in FIG. 10:

FIG. 10*a* illustrates a split chassis and single axle weighing;

FIG. 10*b* illustrates a split-bogie and split chassis weighing;

FIG. 10*c* illustrates a no-split chassis weighing;

FIG. 10*d* illustrates a no-split bogie and split chassis weighing;

FIG. 10*e* illustrates a split-bogie and split chassis weighing;

FIG. 10*f* illustrates a no-split bogie and split chassis weighing.

Any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the device 100 comprises the necessary communication capabilities in the form of e.g., functions, means, units, elements, etc., for performing the present solution. Examples of such functions, means, units, elements are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor 102 of the device 100, may comprise, e.g. one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

The invention claimed is:

1. A device for determining a weight of a single vehicle; the device being configured to:
   obtain a set of weights derived from in-motion weighing of the single vehicle on a single weighing bridge, wherein the single weighing bridge accommodates two or more axles of the single vehicle, and wherein the set of weights comprises: a weight representing a first single axle, a weight representing a second single axle, and at least one weight representing two or more axles of the single vehicle;
   select one or more weights in the set of weights such that the one or more selected weights together represent all axles of the single vehicle and each axle of the single vehicle is only represented once;
   determine a total t of the single vehicle based on the one or more selected weights.

2. The device according to claim 1, configured to determine the total weight of the single vehicle based on a combination of the one or more selected weights.

3. The device according to claim 2, wherein the combination is a sum of the one or more selected weights.

4. The device according to claim 1, configured to
   select a weight in the set of weights representing the most number of axles of the single vehicle.

5. The device according to claim 1, configured to
   select a weight in the set of weights representing any of non-split vehicle, non-split chassis, single axle or non-split bogie and split bogie.

6. The device according to claim 5, configured to
   select a weight representing non-split vehicle before selecting a weight representing non split chassis, single axle or non-split bogie and split bogie.

7. The device according to claim 5, configured to
   select a weight representing non-split chassis before selecting a weight representing single axle or non-split bogie and split bogie.

8. The device according to claim 5, configured to
   select a weight representing single axle or non-split bogie before selecting a weight representing split bogie.

9. The device according to claim 1, configured to
   select weights in the set of weights based on a quality metric associated with each weight.

10. The device according to claim 9, wherein the quality metric is associated with at least one of weight oscillation, number of relevant samples associated with a weight, inclination in an apron associated with the single weighing bridge, manipulation of axle load distribution, unevenness in an approaching road of the single weighing bridge, variations of rolling frictions against the approaching road of the single weighing bridge, and a variation in the speed of the single vehicle over the single weighing bridge.

11. The device according to claim 1, wherein each weight in the set of weights is derived when no wheel of the single vehicle enters or leaves the single weighing bridge so that the number of axles supported by the single weighing bridge is constant for the weight.

12. The device according to claim 11, wherein each weight in the set of weights is derived from sampled weight values when the number of axles supported by the single weighing bridge is constant for the weight.

13. The device according to claim 12, wherein each weight in the set of weights is an average value of sampled weight values when the number of axles supported by the single weighing bridge is constant for the weight.

14. The device according to claim 1, wherein all weights in the set of weights are derived from the same in-motion weighing event.

15. A method for determining a weight of a single vehicle, the method comprising obtaining a set of weights derived from in-motion weighing of the single vehicle on a single weighing bridge, wherein the single weighing bridge accommodates two or more axles of the single vehicle, and wherein the set of weights comprises: a weight representing a first single axle, a weight representing a second single axle, and at least one weight representing two or more axle weights of the single vehicle;

selecting one or more weights in the set of weights such that the one or more selected weights together represent all axles of the single vehicle and each axle of the single vehicle is only represented once;

determining a total weight of the single vehicle based on the one or more selected weights.

16. A non-transitory computer readable medium with a program code for performing a method according to claim 15 when the program code is executed on a computer.

* * * * *